United States Patent
Anders et al.

(10) Patent No.: US 10,260,557 B2
(45) Date of Patent: Apr. 16, 2019

(54) ROTARY MACHINE, BEARING AND METHOD FOR MANUFACTURING A ROTARY MACHINE

(71) Applicants: Jens Anders, Yvetot (FR); Luc Baudelocque, Vernon (FR); Frederic Ponson, Luynes (FR)

(72) Inventors: Jens Anders, Yvetot (FR); Luc Baudelocque, Vernon (FR); Frederic Ponson, Luynes (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 407 days.

(21) Appl. No.: 14/644,224

(22) Filed: Mar. 11, 2015

(65) Prior Publication Data

US 2015/0260221 A1   Sep. 17, 2015

(30) Foreign Application Priority Data

Mar. 11, 2014  (EP) .................................... 14158923

(51) Int. Cl.
*H02K 7/08*  (2006.01)
*H02K 7/09*  (2006.01)
(Continued)

(52) U.S. Cl.
CPC .......... *F16C 32/0402* (2013.01); *F01D 17/02* (2013.01); *F01D 17/20* (2013.01); *F01D 25/16* (2013.01); *F01D 25/162* (2013.01); *F01D 25/164* (2013.01); *F01D 25/166* (2013.01); *F01D 25/168* (2013.01); *F01D 25/18* (2013.01); *F01D 25/183* (2013.01); *F01D 25/186* (2013.01); *F04D 27/001* (2013.01); *F04D 29/058* (2013.01); *F04D 29/059* (2013.01);
(Continued)

(58) Field of Classification Search
CPC .................................. H02K 7/08; H02K 7/09
USPC .................................. 310/90, 90.5; 384/448
IPC .................................................. H02K 7/08,7/09
See application file for complete search history.

(56) References Cited

U.S. PATENT DOCUMENTS 3,484,633 A * 12/1969 Stecher .................. H02K 5/132
                                                        310/87
4,267,477 A *  5/1981 Faulhaber .............. H02K 23/56
                                                        310/154.04

(Continued)

FOREIGN PATENT DOCUMENTS

EP         2677176 A1   12/2013
JP       H05187441 A    7/1993
JP       2008064633 A    3/2008

*Primary Examiner* — John K Kim
(74) *Attorney, Agent, or Firm* — Bryan Peckjian; SKF USA Inc. Patent Dept.

(57) ABSTRACT

A rotary machine, comprising: a stator assembly and a rotor assembly centered on a central axis; a magnetic bearing; and an auxiliary bearing including a first ring held in the stator assembly and a second ring delimiting a gap radially to the central axis relative to the rotor. The second ring is not rotating around the central axis in a primary operation mode and is dragged in rotation around the central axis in a secondary operation mode. The rotary machine includes a monitoring system for detecting a transition from the primary operation mode to the secondary operation mode. The monitoring system comprises a target formed on the second ring and a sensor unit fixed relative to the stator assembly. A bearing and a method for manufacturing a rotary machine are additionally disclosed.

13 Claims, 3 Drawing Sheets

(51) Int. Cl.
  *F16C 32/04*    (2006.01)
  *F01D 17/02*    (2006.01)
  *F01D 25/16*    (2006.01)
  *F04D 27/00*    (2006.01)
  *F16C 39/02*    (2006.01)
  *F04D 29/058*   (2006.01)
  *F04D 29/059*   (2006.01)
  *F16C 41/00*    (2006.01)
  *F01D 17/20*    (2006.01)
  *F01D 25/18*    (2006.01)
  *F16C 33/58*    (2006.01)
  *F16C 19/54*    (2006.01)
  *F16C 19/16*    (2006.01)

(52) U.S. Cl.
  CPC ........ *F16C 19/542* (2013.01); *F16C 32/0406* (2013.01); *F16C 32/0442* (2013.01); *F16C 33/586* (2013.01); *F16C 39/02* (2013.01); *F16C 41/00* (2013.01); *F16C 41/004* (2013.01); *F16C 19/163* (2013.01); *F16C 41/007* (2013.01); *F16C 2300/02* (2013.01); *Y10T 29/49012* (2015.01)

(56) References Cited

U.S. PATENT DOCUMENTS

| | | | |
|---|---|---|---|
| 5,504,381 A * | 4/1996 | Kato | B65H 51/06 310/51 |
| 6,097,121 A * | 8/2000 | Oku | G11B 19/2009 310/425 |
| 6,100,809 A * | 8/2000 | Novoselsky | F16C 19/52 340/648 |
| 6,566,775 B1 * | 5/2003 | Fradella | F16C 32/0442 310/74 |
| 7,367,714 B2 | 5/2008 | Niarfeix et al. | |
| 7,429,133 B2 | 9/2008 | Gallion et al. | |
| 9,279,735 B2 * | 3/2016 | Georgi | F16C 19/18 |
| 9,660,499 B2 * | 5/2017 | Sakawaki | F04D 29/058 |
| 9,689,398 B2 * | 6/2017 | Sakawaki | F04D 29/058 |
| 2004/0196027 A1 * | 10/2004 | Iwamoto | G01P 3/443 324/207.21 |
| 2006/0039639 A1 * | 2/2006 | Aoki | F16C 33/586 384/448 |
| 2010/0002974 A1 * | 1/2010 | Yokoyama | F16C 19/525 384/548 |
| 2010/0270872 A1 * | 10/2010 | Yokoyama | H02K 5/1672 310/43 |
| 2012/0107094 A1 * | 5/2012 | Lillis | F01D 17/06 415/118 |
| 2012/0126648 A1 | 5/2012 | Georgi et al. | |
| 2013/0322801 A1 * | 12/2013 | Den Haak | G01L 5/0009 384/448 |
| 2014/0234139 A1 * | 8/2014 | Sakawaki | F04D 29/058 417/410.1 |
| 2015/0260221 A1 * | 9/2015 | Anders | F01D 17/02 384/448 |

* cited by examiner

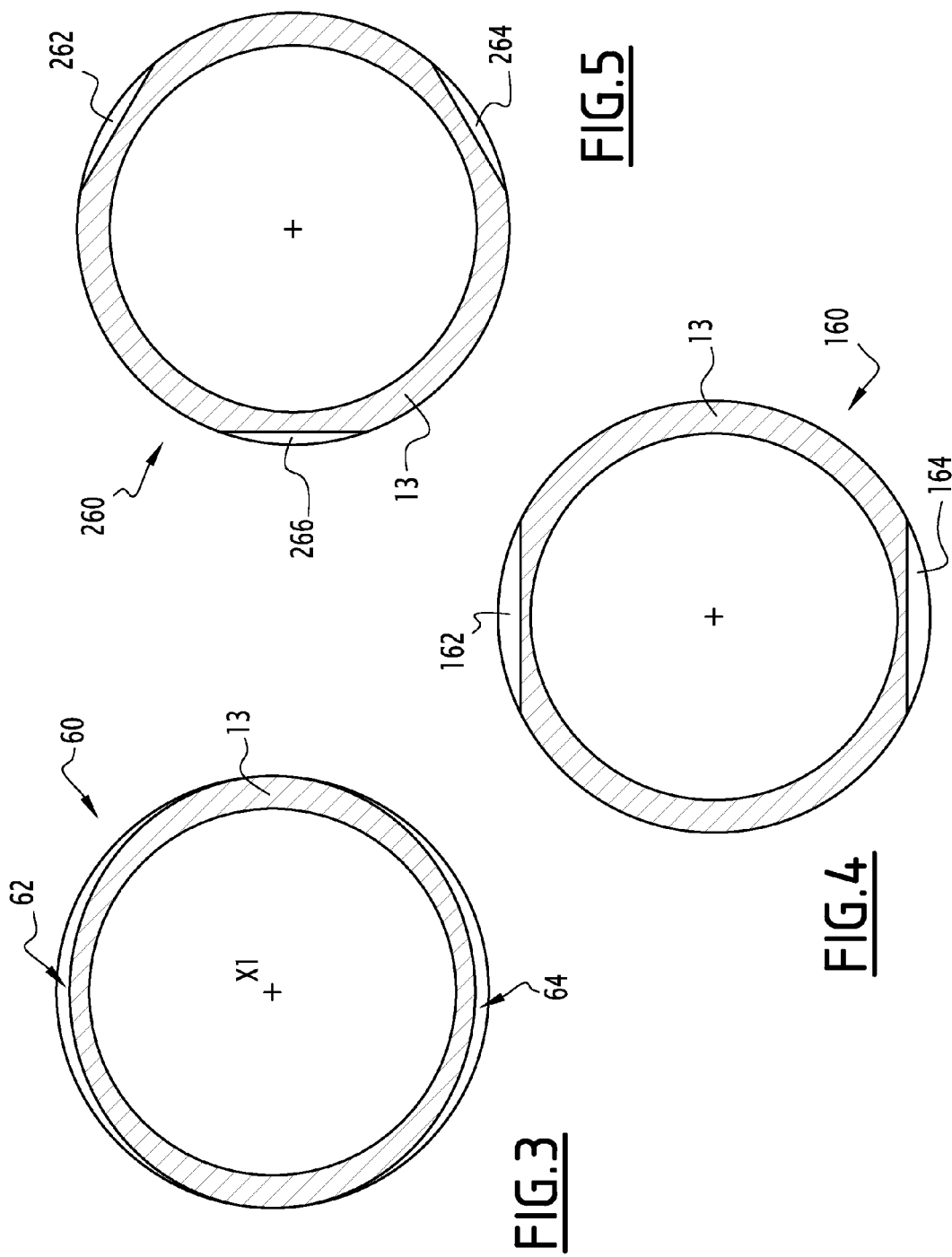

ROTARY MACHINE, BEARING AND METHOD FOR MANUFACTURING A ROTARY MACHINE

CROSS REFERENCE TO RELATED APPLICATIONS

This is a Non-Provisional Patent Application, filed under the Paris Convention, claims the benefit of European Patent (EP) Application Number 14158923.4 filed on 11 Mar. 2014 (11 Mar. 2014), which is incorporated herein by reference in its entirety.

TECHNICAL FIELD OF THE INVENTION

The invention concerns a rotary machine comprising a stator assembly, a rotor assembly, a magnetic bearing and an auxiliary bearing. The invention also concerns a bearing adapted for implementation as an auxiliary bearing in a rotary machine. The invention also concerns a method for manufacturing a rotary machine. The field of the invention relates to rotary machines equipped with magnetic and auxiliary bearings.

BACKGROUND OF THE INVENTION

EP-A-2 677 176 discloses a rotary machine of the electric compressor type, comprising a stator assembly, a rotor assembly, magnetic bearings and auxiliary bearings. The rotary machine comprises sensors for monitoring the position of a central shaft belonging to the rotor assembly and to detect any deviation from nominal position.

In a known manner, the auxiliary bearing equipping a rotary machine may be an anti-friction ball bearing, having an outer ring held in the stator assembly and an inner ring separated by a radial gap from the rotor assembly. The auxiliary bearing is directly exposed to its environment, preferably with a dry and permanent lubrication, without permanent greasing.

In case of failure of the magnetic bearing, the rotary machine is protected by the auxiliary bearing. In normal operation, when the magnetic bearing is working properly, the inner ring of the auxiliary bearing is not rotating and there is no contact between the rotor and the auxiliary bearing. Nevertheless, aerodynamic friction may drag the inner ring into rotation, which will on long term remove the permanent lubrication then damage the auxiliary bearing. Normally, the "break-away torque" needed to start the inner ring rotation of a new auxiliary bearing is higher than the aerodynamic effect. However improper operation or malfunction can sometimes result in a highly reduced break-away torque. Undetected rotation of the auxiliary bearing leads to its deterioration, so that the auxiliary bearing does not protect the rotor assembly anymore from rubbing the stator assembly in case of magnetic bearing failure or process overload.

SUMMARY OF THE INVENTION

The aim of the invention is to provide an improved rotary machine provided with magnetic and auxiliary bearings.

To this end, the invention concerns a rotary machine, comprising: a stator assembly and a rotor assembly centered on a central axis; a magnetic bearing ; and an auxiliary bearing including a first ring held in the stator assembly and a second ring delimiting a gap radially to the central axis relative to the rotor. The second ring is not rotating around the central axis in a primary operation mode and is dragged in rotation around the central axis in a secondary operation mode. According to the invention, the rotary machine includes a monitoring system for detecting a transition from the primary operation mode to the secondary operation mode, the monitoring system comprising a target formed on the second ring and a sensor unit fixed relative to the stator assembly.

Thanks to the invention, abnormal operation of the auxiliary bearing can be monitored simply and efficiently. Other advantageous features of the invention will appear in the description here-after.

According to further aspects of the invention which are advantageous but not compulsory, such a rotary machine may incorporate one or several of the following features:
- The target is machined in a non-functional area of the second ring, by example on its outer diameter and outer side.
- The auxiliary bearing is a standard ball bearing having a second ring on which the target is re-machined after fabrication of the auxiliary bearing.
- The target includes at least one chamfer.
- The target includes at least one hole.
- The sensor unit detects a rotation of the target around the central axis in the secondary operation mode, during normal operation of the magnetic bearing.
- The sensor unit detects vibrations of the target in the primary operation mode.
- The sensor unit includes a probe encapsulated or canned in a housing made of a material resistant to high pressure and/or to corrosive ambiance.
- The sensor unit includes an eddy current probe.
- The sensor unit includes a magnetic probe.
- The sensor unit detects the position or the speed of the target around the central axis.
- The first ring is the outer ring of the auxiliary bearing and the second ring is the inner ring of the auxiliary bearing.
- The first ring is the inner ring of the auxiliary bearing and the second ring is the outer ring of the auxiliary bearing.

The invention also concerns a bearing, adapted for implementation as an auxiliary bearing in a rotary machine as mentioned here-above. The bearing includes a first ring adapted to be held in a stator assembly, a second ring and a target which is formed on the second ring and configured for detection by a sensor unit.

The invention also concerns a method for manufacturing a rotary machine as mentioned here-above. The method includes the following steps:
forming the target on the second ring of the auxiliary bearing;
positioning the sensor unit relative to the stator assembly;
mounting the stator assembly, the rotor assembly, the magnetic bearing and the auxiliary bearing.

BRIEF DESCRIPTION OF THE DRAWINGS

The invention will now be explained in correspondence with the annexed figures, and as an illustrative example, without restricting the object of the invention. In the annexed figures:

FIG. 3 is a side view along arrow III on FIG. 1, showing the inner ring of the auxiliary bearing;

FIGS. 4 and 5 are views similar to FIG. 3, each showing another embodiment of the invention.

DETAILED DESCRIPTION OF SOME EMBODIMENTS

Figure 1:
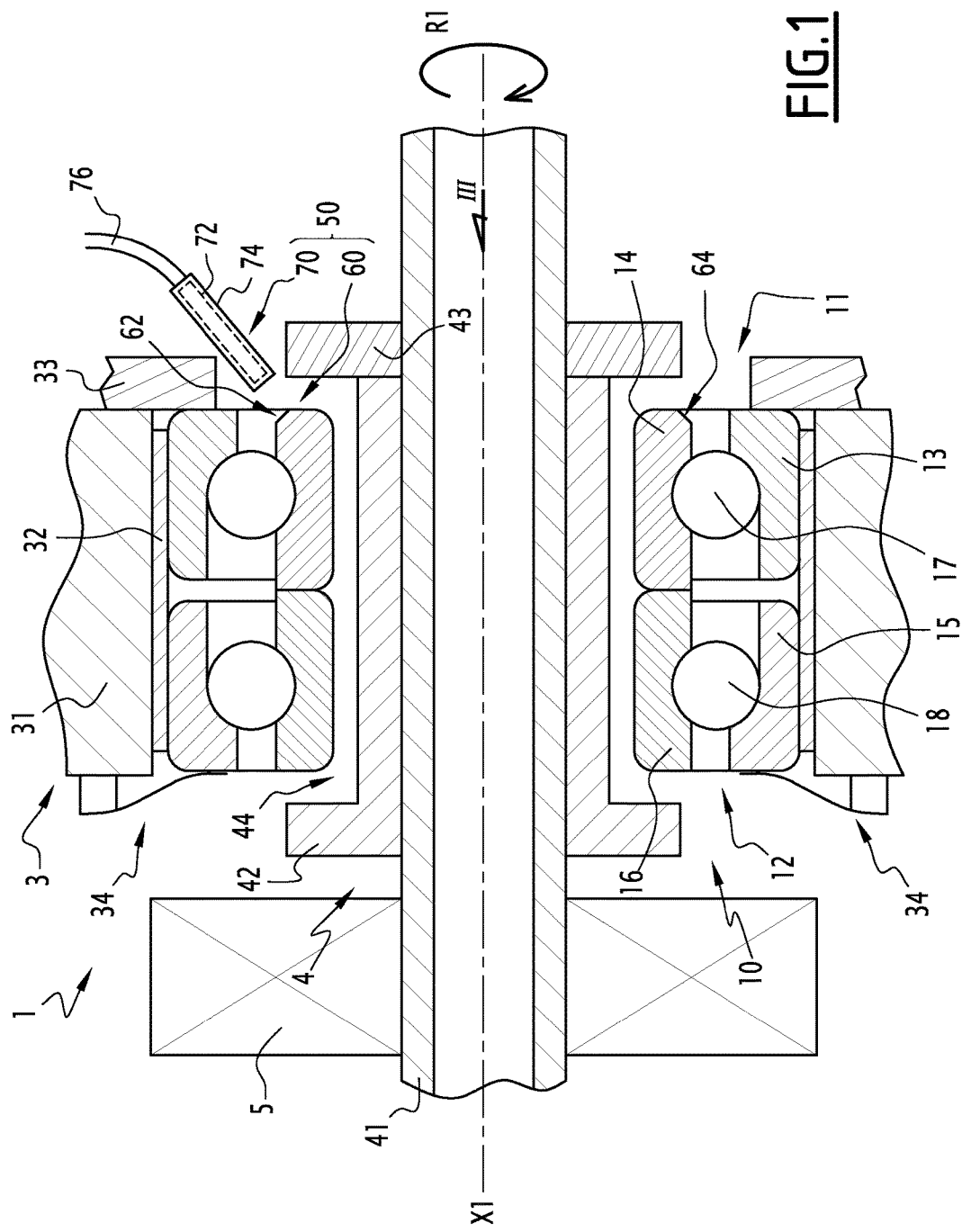
FIG. 1 is a longitudinal sectional view of a rotary machine according to the invention, comprising a stator, a rotor, a magnetic bearing, an auxiliary bearing and a monitoring system.
Figure 2:
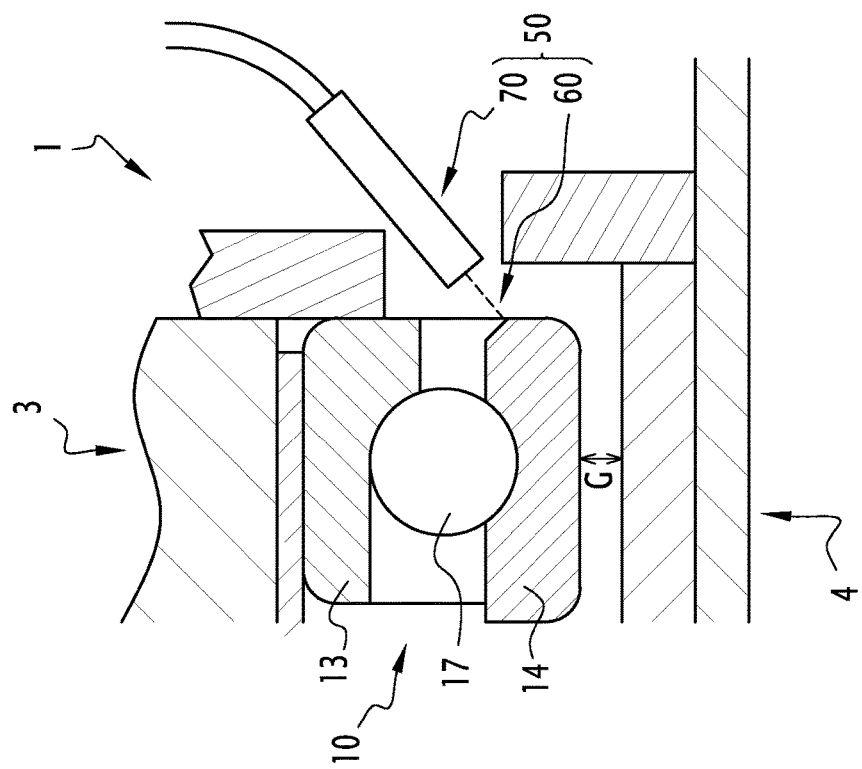
FIG. 2 is a partial view of FIG. 1, at a larger scale, showing the auxiliary bearing and the monitoring system above the central axis of the rotary machine.

FIGS. 1 to 3 show a rotary machine 1 centered on a central axis X1.

For example, the rotary machine 1 may be an electric compressor equipping an automotive vehicle. Alternatively, the rotary machine 1 may be of any kind adapted for a transportation vehicle, a machine-tool, a household apparatus, etc. Some or all parts of the rotary machine 1 may operate in a pressurized medium, for example natural gas.

The rotary machine 1 comprises a stator assembly 3, a rotor assembly 4, a magnetic bearing 5, an auxiliary bearing 10 and a monitoring system 50.

The stator assembly 3 comprises a stator including a plurality of windings 3A, a housing 31, a compliant tubular bush 32, a lateral holder 33 and a backing device 34. The stator including a plurality of windings 3A generates a first magnetic field. Tubular bush 32 is fitted inside housing 31. Holder 33 and device 34 form means for fastening the auxiliary bearing 10 to the stator assembly 3.

The rotor assembly 4 comprises a rotor having a plurality of elements 4A, a hollow shaft 41, a tubular element 42 and an annular element 43. The rotor having a plurality of elements 4A reacts with the first magnetic field to generate a second magnetic field centered on the central axis. Elements 42 and 43 are mounted on shaft 41 and delimit a space 44 partly receiving the auxiliary bearing 10. The rotor assembly 4 is movable in rotation R1 around axis X1.

The magnetic bearing 5 is schematically represented on FIG. 1 only, its arrangement relative to the stator assembly 3 and rotor assembly 4 being not shown, for simplification purpose.

The auxiliary bearing 10, also known as emergency bearing, landing bearing, back-up bearing or touch down bearing, supports the rotor assembly 4 essentially during a starting or stopping operation of the rotary machine 1, and also during brief intermittent periods in case of shock-loads in the event of a total or partial failure of the magnetic bearing 5.

The auxiliary bearing 10 includes two rows of ball bearings 11 and 12, also known as tandem ball bearings 11 and 12, preloaded and particularly adapted for use in pressurized environment. Bearing 11 includes an outer ring 13 and an inner ring 14, while bearing 12 includes an outer ring 15 and an inner ring 16. Bearing 11 includes series of balls 17 located between ring 13 and 14, while bearing 12 includes series of balls 18 located between ring 15 and 16. Balls 17 and 18 may be made of ceramic or steel. Outer rings 13 and 15 are fitted inside tubular bush 32. Lateral holder 33 is positioned against outer ring 13, while backing device 34 is positioned against outer ring 15. Holder 33 and device 34 form means for fastening outer rings 13 and 15 to the stator assembly 3. Inner rings 14 and 16 are located in space 44.

In normal operation, a gap or clearance is provided radially to axis X1 between the auxiliary bearing 10 and the rotor assembly 4, more precisely between inner rings 14, 16 and tubular element 42. Gap G between ring 14 and rotor assembly 4 is shown on FIG. 2. For example, gap G provided for the auxiliary bearing 10 is about one half the width of the air gap of the magnetic bearing 5.

In practice, inner rings 14 and 16 of the auxiliary bearing 10 are not rotating around axis X1 in a primary operation mode and are dragged in rotation around axis X1 in a secondary operation mode. The preload exerted on the auxiliary bearing 10 increases the take away torque, i.e. the minimum torque to apply to the tandem ball bearings 11 and 12 to start to drag the inner rings 14 and 16 into rotation around axis X1, thus switching from the primary mode to the secondary mode. Typically, this minimum torque may be comprised between 3 and 5 N·m, but may be significantly less. It depends on the size and type of the ball bearing and of the surrounding structure.

Today, rotary machines 1 are working in higher and higher pressure and with higher and higher gas density. In case of improper operation or malfunction, the internal friction coefficient may decrease. Then the aerodynamic effect due to the rotation of the rotor assembly 4 may be sufficient to drag the auxiliary bearing 10 into rotation. Under those conditions, the auxiliary bearing 10 may be damaged and lose its stiffness, therefore lose its aptitude to protect the rotary machine 1 in case of failure of the magnetic bearing 5.

To detect the rotation of the auxiliary bearing 10, known solutions have major drawbacks.

According to a first solution, the rotation of the balls 17 and 18 of the auxiliary bearing 10 may be monitored by a position sensor, for example an eddy current probe. However, this solution does not work with balls 17 and 18 made of ceramic, which is the case most of the time.

According to a second solution, a magnetic target may be attached to the inner ring 14 of the auxiliary bearing 10. However, this solution implies specific manufacturing of a magnetic target. Moreover, the magnetic target may not be compatible, on the one hand, with the environment of the auxiliary bearing 10 that can be corrosive and on, the other hand, with the important accelerations the inner ring 14 in case of rotor drop or landing.

According to the invention, the rotary machine 1 is equipped with a monitoring system 50 comprising a target 60 formed on ring 14 and a sensor unit 70 fixed relative to the stator assembly 3. The monitoring system 50 allows detecting a transition from the primary operation mode where ring 14 is not rotating around axis X1 to the secondary operation mode where ring 14 is dragged in rotation around axis X1.

Preferably, target 60 is machined in a non-functional area of ring 14, by example on its outer diameter and outer side as on FIGS. 1 to 3. Target 60 is machined with an irregular shape around axis X1, for example with a non-circular shape. In other words, axis X1 does not define an axis of symmetry for target 60. Nevertheless, the balancing of the inner ring 14 is kept.

According to a particular embodiment, the auxiliary bearing 10 is a standard ball bearing having an inner ring 14 on which the target 60 is re-machined after fabrication of the auxiliary bearing 10. Thus, a standard reference can be used for the auxiliary bearing 10, without specific manufacturing that would drastically increase cost and procurement time.

As shown on FIG. 3, target 60 includes two chamfers 62 and 64, which are diametrically opposite on either side of axis X1. Each chamfer 62 and 64 has a truncated irregular shape. The surface of each chamfer 62 and 64 varies from a maximal to a minimal defined at 90° around axis X1 on both sides of the maximal. Near the maximal surface, the diameter reduction of ring 14 may be comprised between 0.1 and 1 millimeters, for example 0.2 millimeters. The lateral face of ring 14 has an oval outer shape, as shown on FIG. 3. Such chamfers 62 and 64 does not weaken inner ring 14 in comparison with slots, so that inner ring 14 is able to withstand huge acceleration at the time of rotor landing, without jeopardizing any robustness characteristic of the auxiliary bearing 10. Alternatively, target 60 may include only one chamber 62 or 64.

The sensor unit 70 is adapted to detect a rotation of target 60 around axis X1. The sensor unit 70 reads a distance between its tip and the outer diameter of the inner ring 14. Therefore, the sensor unit 70 detects the presence of the chamfers 62 and 64 in front of its tip. The sensor unit 70 may be configured as a position sensor for detecting the position of target 60 around axis X1 or configured as a speed sensor for detecting the speed of target 60 around axis X1. In particular, the sensor unit 70 is adapted to detect a rotation of the target 60 around axis X1 in the secondary operation mode, during normal operation of the magnetic bearing 5. In addition, the sensor unit 70 may be configured to detect vibrations of target 60 in the primary operation mode, while the rotary machine 1 is working or during a maintenance inspection.

As shown on FIG. 1, the sensor unit 70 includes a probe 72, a housing 74 and a transmission cable 76. Probe 72 is encapsulated or canned in housing 74, which is made of a material resistant to high pressure and/or to corrosive ambiance. Depending on the rotary machine 1, probe 72 may be configured as an eddy current probe or as a magnetic probe. Eddy current probe is less expansive, while magnetic probe is more efficient in severe environments.

The monitoring system 50 allows verifying whether the inner ring 14 is dragged into rotation and emitting a warning for preventive maintenance. System 50 can also be used for health analysis of the auxiliary bearing 10 during or after landing. Advantageously, system 50 avoids adding any component on the auxiliary bearing 10.

Thanks to the invention, there is no need of specific bearing manufacturing prior to forming the target 60, no stress created inside ring 14, no jeopardizing of any characteristic of the original ball bearing 11, no need of adding balance means on ring 14, no need of adding any rotating part and no increase of the axial length of the assembly formed by the auxiliary bearing 10 and the monitoring system 50.

Figure 6:
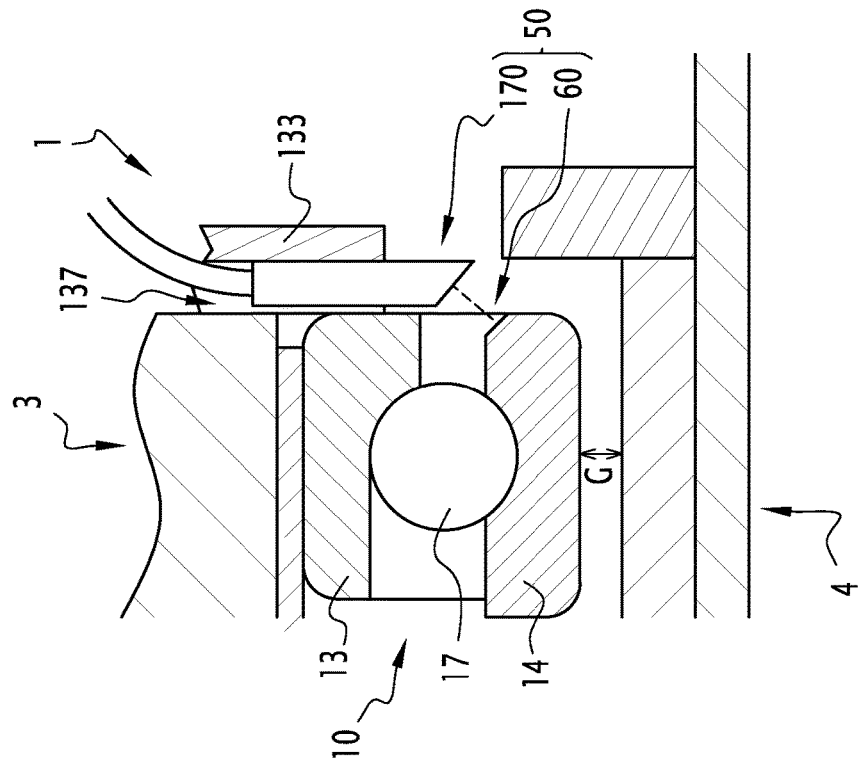
FIG. 6 is a view similar to FIG. 2, showing another embodiment of the invention.

Other embodiments of the invention are represented on FIGS. 4 to 6. In these embodiments, elements similar to the first embodiment have the same references and work in the same way. Only the differences with respect to the first embodiment are described hereafter.

FIG. 4 shows the inner ring 14 provided with a target 160 including two chamfers 162 and 164, which are diametrically opposite on either side of axis X1, each having a plane surface.

FIG. 5 shows the inner ring 14 provided with a target 260 including three chamfers 262, 264 and 266, distributed at 120° around axis X1, each having a plane surface.

FIG. 6 shows the auxiliary bearing 10 and the monitoring system 50 provided with target 60 and a sensor unit 170. Target 60 is similar to the first embodiment or may be configured differently. Sensor unit 170 is positioned in a cavity 137 formed inside a lateral holder 133. Sensor unit 170 has a tip which is different from the tip of sensor unit 70, in order to be able to read target 60.

Other non-shown embodiments of the rotary machine 1 can be implemented within the scope of the invention. In particular, stator assembly 3, rotor assembly 4, magnetic bearing 5, auxiliary bearing 10 and/or monitoring system 50 may have a different configuration or arrangement within the scope of the invention.

According to a non-shown embodiment, the rotary machine 1 may comprise several magnetic bearings 5 and/or several auxiliary bearings 10. Whatever the embodiment, the rotary machine 1 comprises at least one magnetic bearing 5 and at least one auxiliary bearing 10.

According to another non-shown embodiment, the auxiliary bearing 10 may include only one or more than two rows of ball bearings 11 and 12.

According to another non-shown embodiment, the auxiliary bearing 10 may be a needle bearing or a plain bearing.

According to another non-shown embodiment, inner ring 13 may be fixed relative to a stator assembly 3, while outer ring 14 may be provided with target 60.

According to another non-shown embodiment, the target 60, 160 or 160 may include at least one hole instead of at least one chamfer.

According to another non-shown embodiment, several sensor units 70 may be arranged in a symmetric way around axis X1. Preferably, the signals are compared to each other such as to generate a velocity information independent from the position information of the ring 14.

In addition, technical features of the different embodiments can be, in whole or part, combined with each other. Thus, the rotary machine 1 and its manufacturing method can be adapted to the specific requirements of the application.

The invention claimed is:

1. A rotary machine, comprising:
 a stator assembly having a housing which, in cross section, defines an axially extending inner radial surface and a tubular bush fitted inside the housing and disposed on the axially extending inner radial surface;
 a rotor assembly having a tubular element disposed on an outer surface of a hollow shaft;
 a magnetic bearing;
 an auxiliary bearing including:
  a first ring held in the stator assembly; and
  a second ring delimiting a gap radially to the central axis relative to the tubular element of the rotor such that a radial space is defined between an outer surface of the tubular element and the second ring of the auxiliary bearing, the stator assembly axially overlapping all of the auxiliary bearing, an entire axial length of the auxiliary bearing being axially aligned over the tubular element of the rotor assembly, the tubular element being interposed between the auxiliary bearing and the hollow shaft, the auxiliary bearing is located entirely radially inside of the stator, a radially outer surface of the auxiliary bearing being entirely axially overlapped by the stator and a radially inner surface of the auxiliary bearing being entirely axially overlapped by the tubular element of the rotor;
 a monitoring system for detecting a transition from a primary operation mode to a secondary operation mode, the monitoring system comprising a target formed by the second ring and a sensor unit fixed relative to the stator assembly, and wherein the second ring is not rotating around the central axis in the primary operation mode and is dragged in rotation around the central axis in the secondary operation mode.

2. The rotary machine according to claim 1, wherein the target is formed by a chamfer in a shape of the second ring.

3. The rotary machine according to claim 1, wherein the target is machined in a portion of the second ring which does not form a raceway, wherein a non-functional area of the second ring is one of an outer diameter of the second ring or an outer side of the second ring.

4. The rotary machine according to claim 1, wherein the auxiliary bearing has a second ring, wherein the target is re-machined on the second ring after fabrication of the auxiliary bearing.

5. The rotary machine according to claim 1, wherein the target includes at least one chamfer.

6. The rotary machine according to claim 1, wherein the target includes at least one hole.

7. The rotary machine according to claim 1, wherein the sensor unit detects a rotation of the target around the central axis in the secondary operation mode, during non-normal operation of the magnetic bearing.

8. The rotary machine according to claim 1, wherein the sensor unit detects vibrations of the target in the primary operation mode.

9. The rotary machine according to claim 1, the sensor unit further comprising a probe, wherein the probe is one of encapsulated or canned in a housing made of a material resistant to at least one of high pressure and to corrosive ambiance.

10. The rotary machine according to claim 1, the sensor unit further comprising an eddy current probe.

11. The rotary machine according to claim 1, the sensor unit further comprising a magnetic probe.

12. The rotary machine according to claim 1, wherein the sensor unit detects one of a position or a speed of the target around the central axis.

13. The rotary machine according to claim 1, wherein the first ring is the outer ring of the auxiliary bearing and the second ring is the inner ring of the auxiliary bearing.

* * * * *